United States Patent [19]

Watanabe et al.

[11] Patent Number: 5,112,695
[45] Date of Patent: May 12, 1992

[54] VESSEL LID COMPRISING LAMINATED MATERIAL

[75] Inventors: Toshiaki Watanabe; Masatsune Shibue, both of Kawasaki; Hiroshi Matsubayashi, Kamakura; Ikuo Komatsu, Yokohama, all of Japan

[73] Assignee: Toyo Seikan Kaisha Ltd., Tokyo, Japan

[21] Appl. No.: 651,255
[22] PCT Filed: Aug. 2, 1990
[86] PCT No.: PCT/JP90/00990
    § 371 Date: May 20, 1991
    § 102(e) Date: May 20, 1991
[87] PCT Pub. No.: WO91/01922
    PCT Pub. Date: Feb. 21, 1991

[30] Foreign Application Priority Data

Aug. 2, 1989 [JP] Japan .................................. 1-199353

[51] Int. Cl.⁵ .............................................. B32B 15/08
[52] U.S. Cl. ..................................... 428/458; 428/480
[58] Field of Search ..................... 428/458, 461, 35.8, 428/35.9, 36.91, 480; 220/456

[56] References Cited

U.S. PATENT DOCUMENTS

| | | | |
|---|---|---|---|
| 4,339,483 | 7/1982 | Ueno et al. | 428/458 X |
| 4,452,842 | 6/1984 | Borges et al. | 428/461 X |
| 4,477,501 | 10/1984 | Kojima et al. | 428/35.9 |
| 4,735,835 | 4/1988 | Taira et al. | 428/35.8 |

Primary Examiner—Thomas J. Herbert, Jr.
Attorney, Agent, or Firm—Sughrue, Mion, Zinn, Macpeak & Seas

[57] ABSTRACT

For the easily openable metal vessel lids openable by severing the scope with the aid of an opening piece, the formation of pinholes and/or cracks can be prevented, the corrosion resistance of the vessel lids as a whole (including the scored part) is improved, and the openability can be markedly improved by lessening the force required to open the vessel lids and, furthermore, feathering can be prevented by limiting the X-ray diffraction intensity ratio of the biaxially drawn polyester film provided onto at least the interior side of the vessel to within the range of from 4 to 17 and also by limiting the anisotropy index of in-plane crystal orientation to 30 or less.

5 Claims, 5 Drawing Sheets

VESSEL LID COMPRISING LAMINATED MATERIAL

BACKGROUND OF THE INVENTION (1) Field of the Invention

The present invention relates to a vessel lid constructed of a laminated material. More particularly, the present invention relates to a vessel lid which has excellent corrosion resistance, openability and feathering resistance, and drop resistance, particularly an easily openable vessel lid.

(2) Description of the Related Art

There are offered to general use cans prepared with an easily openable top end as package-use cans which can be easily opened without employing a special gadget. For the aforementioned vessel lid metallic materials constructed of aluminum, tin or tin-free steel are used for workability so that the opening section in the vessel lid constructed of a metal sheet is outlined by a score cut to a midway depth into the metal sheet, a rivet is formed in said opening section from the vessel lid sheet per se and a pull tab is fixed with said rivet. The aforementioned vessel lid is lapped lock seamed with the flange on the can body by double crimping (the two edges are first hooked and then bumped or flattened together to form five folds of metal).

The aforementioned easily openable vessel lid requires touch-up coating on its inside surface, since the coating on the internal surface is susceptible to injuries at the scoring step or at the riveting step.

There is disclosed in Japanese Patent Application Sho-62-52045, as a vessel lid which does not require touch-up coating and yet imparts excellent corrosion resistance, an easily openable vessel lid constructed of a composite material consisting of an aluminum substrate, a biaxially drawn polyethylene terephthalate film layer having a thickness of 10 to 40 microns placed on the inside of said substrate and an epoxy-phenolic resin adhesive primer layer having a thickness of 0.3 to 3 microns which is interposed between the aluminum substrate and the film layer, which is characterized in that a score is formed in said aluminum substrate to a midway depth in the vertical direction to its surface.

There is proposed in Japanese Patent Application Sho-63-12445 the provision of an epoxy thermosetting plastic coating containing a lubricant onto the film surface for preventing formation of pinholes or cracks in the film when said composite material contacts a tool or a conveying device.

The coating consisting of a polyester film is excellent in the continuity compared with the coating formed with so-called liquid paint, is excellent in the workability which is an inherent property of any thermoplastic resin, particularly biaxially oriented one has a high mechanical strength and is excellent in the dimensional stability and the heat stability. Although the polyester film has most excellent properties among all thermoplastic films as described above, there still remained various unresolved problems for the polyester film in its application to the easily openable vessel lid.

That is to say, in cases where the metallic material for the vessel lid is a steel sheet, since steel has a higher strength than a aluminum it requires a strong power to break the score, keeping the consumer from opening the easily openable vessel lid constructed of a steel sheet, or making the customer feel it difficult to open it or even causing the tab to be broken, thus impairing the openability.

As a means to improve the openability of the easily openable vessel lid constructed of a steel sheet, it has been attempted to increase the depth of the score. It was, however, the drawback of a deep score that cracks or pinholes are formed in the polyester coating provided onto the metal surface in advance, hence the corrosion resistance is deteriorated.

Moreover, the polyester coating often suffered injuries during riveting or bonding the pull tab to the vessel lid, and re-coating of an organic coating material after the tab fixing step and the scoring step was required to a disadvantage from the productivity point of view.

Therefore, it has remained impossible to obtain an easily openable vessel lid constructed of a steel sheet which is satisfactory with respect to the productivity, corrosion resistance and openability in combination.

Moreover, even in cases where the metallic material for vessel lid has a low strength as is the case with an aluminum alloy, it requires a stronger power to open the vessel lid provided with a polyester coating than for those provided with a liquid coating, and sometimes causes feathering when the vessel lid is opened.

Although the openability can be improved by increasing the depth of the score, an attempt to deepen the score would lead to formation of cracks or pinholes in the polyester coating provided onto the metal surface in advance as is the case with the vessel lid constructed of a steel sheet, thus deteriorating the corrosion resistance. Consequently, it was requisite to go through a hardly productive step of once again providing the surface with an organic coating one by one after the scoring step, depending on the condition of the vessel lid.

The present inventors have discovered through comprehensive research on polyester films used for lamination that the formation of cracks and pinholes in fabrication of the easily openable vessel lid and occurrence of feathering in opening the vessel lid or the openability are closely related with the crystalline orientation in the film in a specific direction and the in-plane anisotropy of crystal orientation and, furthermore, discovered that the aforementioned drawbacks can be effectively eliminated by limiting the crystal orientation and in-plane anisotropy of crystal orientation within specific ranges.

SUMMARY OF THE INVENTION

It is therefore a primary object of the present invention to provide an easily openable vessel lid of a metal-polyester laminate type which has excellent corrosion resistance, openability, feathering resistance and drop resistance in combination.

According to the present invention, in the easily openable metallic vessel lid for which the process of opening is effected by cutting the score with the aid of a pull tab, there is provided an easily openable vessel lid having excellent corrosion resistance, openability and feathering resistance, which is characterized in that the vessel lid is constructed of a metallic material and a laminate constructed of a biaxially drawn polyester film composed mainly of ethylene terephthalate units which is provided at least onto the inside surface of the can, the aforementioned film having an X-ray diffraction intensity ratio satisfying the following formula:

$$17 \geq I_A/I_B \geq 4 \qquad (1)$$

where $I_A$ represents the X-ray diffraction intensity by the diffraction plane parallel to the surface of the polyester film, which has a spacing of about 0.34 nm (CuKα X-ray diffraction angle is 24 Deg. to 28 Deg.), and $I_B$ represents the X-ray diffraction intensity by the diffraction plane parallel to the polyester film surface, which has a spacing of about 0.39 nm (CuKα X-ray diffraction angle is 21.5 Deg. to 24 Deg.) and the in-plane anisotropy index of the crystal orientation of the film layer is 30 or less.

BRIEF DESCRIPTION OF THE DRAWINGS

FIGS. 3-A and 3-B are diagrams showing enlarged cross-sectional view of the easily openable vessel lid.

PREFERRED EMBODIMENT OF THE INVENTION

The present invention has been completed based on the finding of the fact that the scoring can be carried out to a deeper depth than in the conventional arrangement without having cracks or pinholes formed by limiting the $I_A/I_B$ ratio 5 of biaxially drawn polyester film in the laminate to within a range of 4 to 17 and also by limiting the in-plane anisotropy index of the crystal orientation of the film layer to 30 or less, and thus the problems of formation of feathering or breakage of the pull tab at the time of opening the vessel lid can be resolved and the corrosion resistance and openability are markedly improved.

Figure 1:
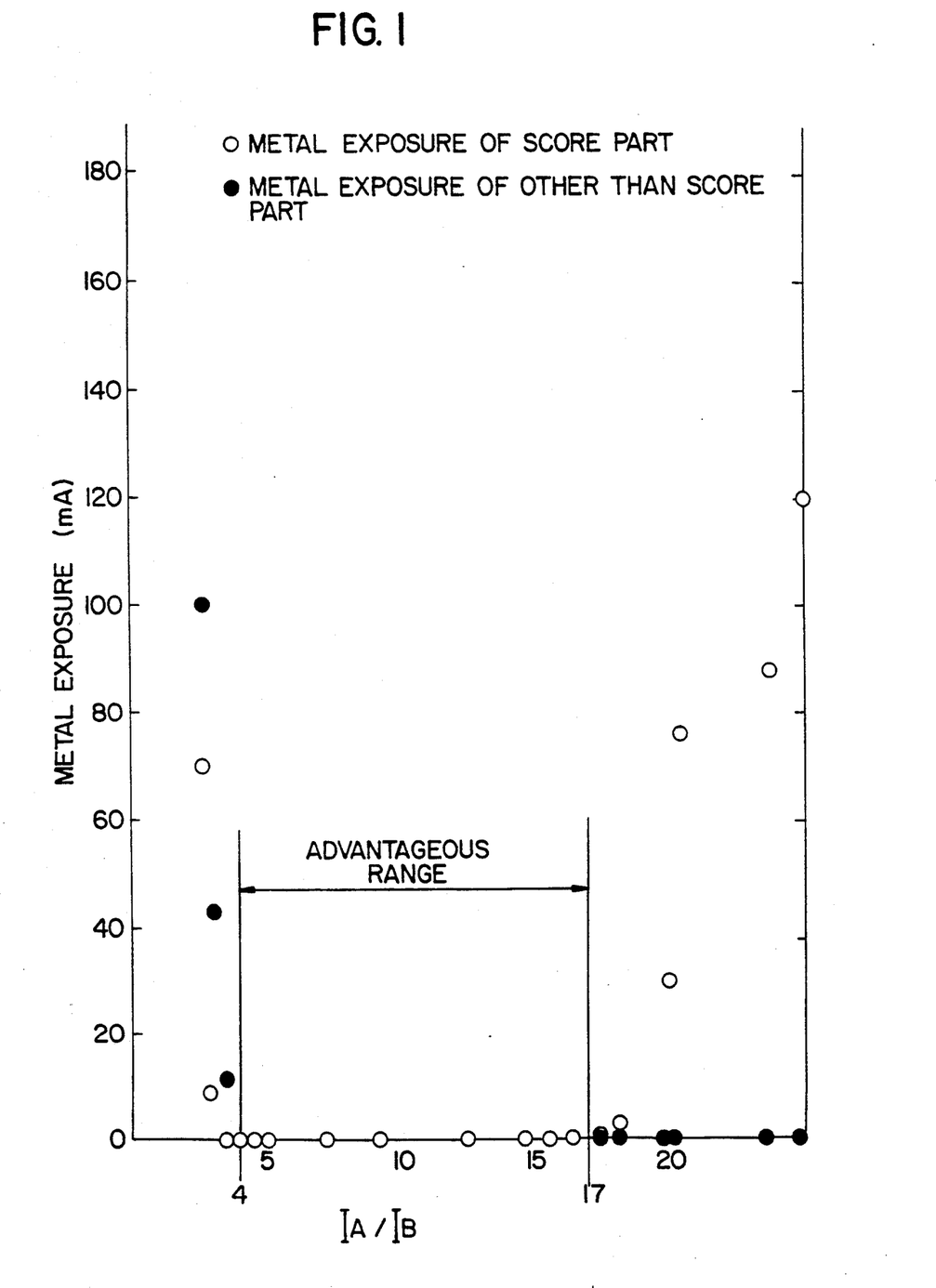
FIG. 1 is a graph illustrating the relation between $I_A/I_B$ and the metal exposure (leakage current) which is observed in a polyester film-laminated aluminum vessel lid.

FIG. 1 of the accompanying drawing is a graph showing a relationship between $I_A/I_B$ of a biaxially drawn polyester film represented on the abscissa and the metal exposure after the forming of the vessel lid represented on the ordinate for an easily openable vessel lid constructed of a laminated aluminum sheet provided with a polyester film of a 23 microns thickness, in which metal exposures of the scored section are plotted with white circles and metal exposures of the area other than the scored section are plotted with black circles, based on Table 1 showing the data furnished in Examples and Comparative Examples which are set forth hereinafter (the anisotropy index is constant at 0.9).

From the results shown in FIG. 1, it is understood that if $I_A/I_B$ is controlled to 4 to 17, the metal exposure of the scored section can be maintained at 0.002 mA or lower and the metal exposure of the area other than the scored section at a level lower than 0.1 mA.

$I_A/I_B$ of the biaxially drawn polyester film, referred to in the present specification, is determined according to the following method.

Method for Measurement of $I_A/I_B$

A sample to be measured is collected from the flat part of the vessel lid. The measurement is conducted according to the following procedures using an X-ray diffractometer.

The measurement conditions are as follows. Copper (wavelength lambda = 0.1542 nm) is used for target, the tube voltage and current are about 30 KV and about 100 mA, and a light-receiving slit having a slit width smaller than 0.1 Deg. expressed as the angle, is selected so that the two diffraction peaks of the diffraction plane having a spacing of about 0.39 nm (2 theta is about 22.5 Deg.) and the diffraction plane having a spacing of about 0.34 nm (2 theta is about 26 Deg.) can be separated from each other. The sample is attached so that each of the incident and reflection angles of the X-ray is theta and the incident X-ray and the diffracted X-ray are symmetric with each other with respect to the normal line to the film plane (the diffraction angle is 2 theta), and while the incident angle theta and the reflection angle theta are always kept equal to each other, the X-ray diffraction spectrum is measured by scanning over the diffraction angle 2 theta range of from 20 to 30 Deg.

Figure 2:
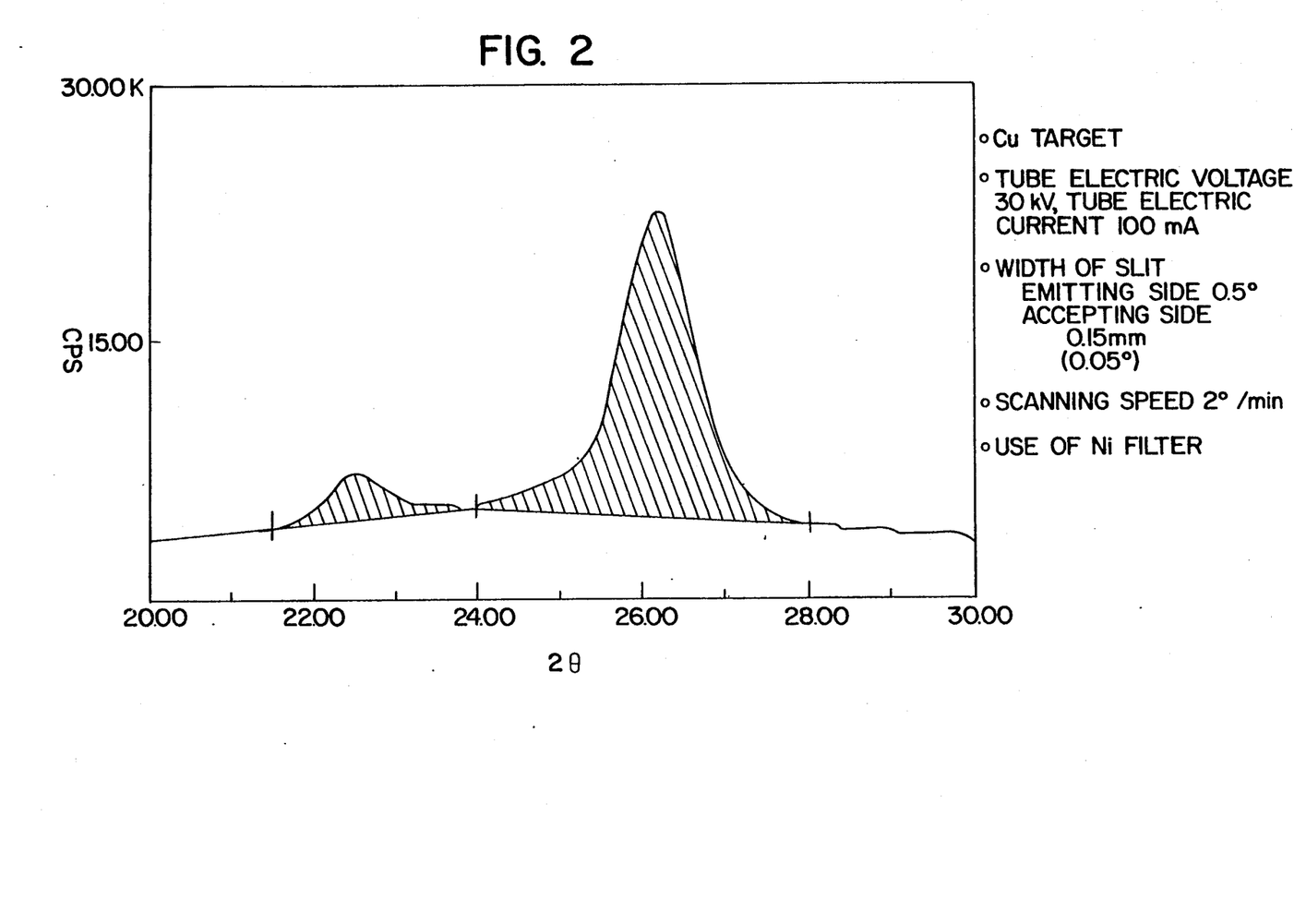
FIG. 2 is an X-ray diffraction diagram of an example of the biaxially drawn polyester film.

An example of the measurement is shown in FIG. 2.

The integrated intensities (peak areas) $I_B$ and $I_A$ of the diffraction of the diffraction plane having a spacing of about 0.39 nm (2 theta is about 22.5 Deg.) and the diffraction of the diffraction plane having a spacing of about 0.34 nm (2 theta is about 26) are determined, and the intensity ratio $I_A/I_B$ is calculated. As shown in FIG. 2, straight lines are drawn as backgrounds between the intensities at 2 theta = 24 Deg. and 2 theta = 28 Deg. and between the intensities at 2 theta = 21.5 and 2 theta = 24 Deg., and in the diagram where the backgrounds are thus drawn, the intensities correspond to the hatched portions.

The anisotropy index of the in-plane crystal orientation is determined in the following manner. Namely, the refractive indices are measured with respect to all the directions parallel to the film plane by using an Abbe refractometer according to customary procedures. The refractive index in the direction where the in-plane refractive index is largest is designated as $n_{max}$ and the refractive index in the direction where the in-plane refractive index is smallest is designated as $n_{min}$, and the anisotropy index is determined according to the following formula:

$$\text{Anisotropy index } (n_{max} - n_{min}) \times 10^3 / n_{min} \qquad (2)$$

The fact that $I_A$ and $I_B$ of a polyester film has close relations to the formation of pinholes or cracks have been found as the result of trial and error based on various experiments. If the X-ray diffraction intensity ratio $I_A/I_B$ exceeds the above-mentioned range, cleavage or rupture is readily caused in the polyester by fibrillation, and thus pinholes are formed or cracking is caused in the scored part, resulting in degradation of the corrosion resistance. The tendency toward occurrence of cleavage or rupture leads to feathering. If the $I_A/I_B$ value is below the above-mentioned range, the heat stability of the drawn crystals is reduced, and the heat stability of the oriented crystals lowers and cracking is caused in the polyester coating of the vessel lid at the to-be-riveted area and the bead which are to be subjected to the bulging and the bending jobs after heating, with the results that the corrosion resistance is degraded.

In the present invention, the foregoing defects are overcome by controlling $I_A/I_B$ with a defined range.

If the anisotropy index of the in-plane orientation of crystals exceeds a specific limit, properties dependent on the crystal orientation of the polyester film become wide spread and local cracking of the coating at the scored part is caused and the corrosion resistance of the vessel lid is degraded.

In view of the mechanical strength, dimensional stability and heat resistance, it is preferred that the density of the polyester film in the laminate be in the range of from 1.345 to 1.395 g/cm$^3$.

Figure 3:
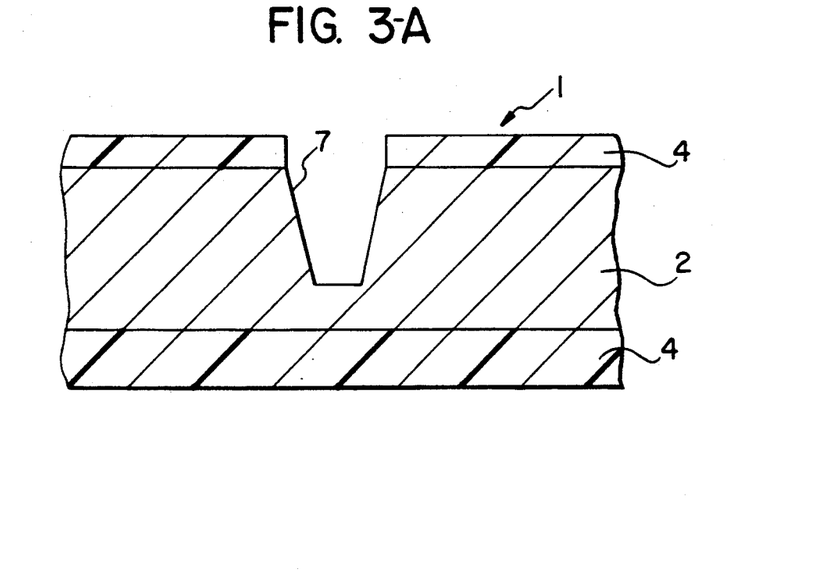

Referring to FIG. 3-A and FIG. 3-B showing an enlarged cross-sectional structure of an easily openable vessel lid of the present invention, said vessel lid (1) is shown with its outside surface facing upward and its inside surface facing downward, it is constructed as a laminate of a metallic material (2), a polyester film layer (4) placed inward from said metallic material, and if so desired an adhesive primer layer (3) (FIG. 3-B) between said film layer (4) and said metallic material (2), and if so desired a top coat layer consisting of thermosetting plastic (5) provided on said film layer (4) and a protective coating layer (6) provided on the outside surface of said metallic material (2), and in this laminate an openable score (7) is formed from its outside to as far as the score reaches a midway depth of the thickness of said metallic material.

Figure 4:
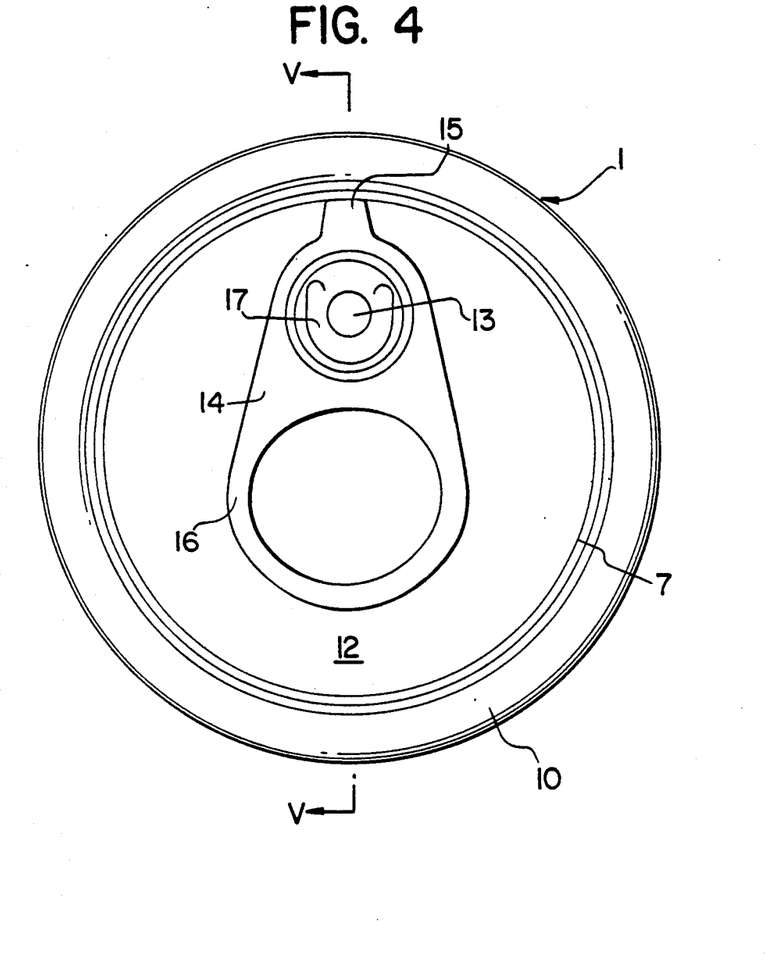
FIG. 4 is a top view of an example of the easily openable vessel lid of the present invention.
Figure 5:
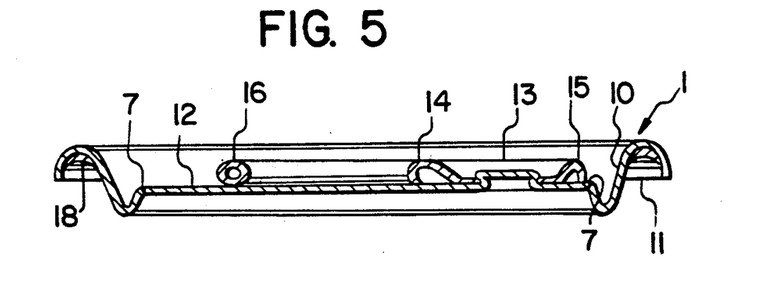
FIG. 5 is a cross-sectional view of the easily openable vessel lid along a line V—V shown in FIG. 4.

Referring to FIG. 4 (the top view) and FIG. 5 (the cross-sectional side view) which show the overall construction of an easily openable vessel lid in the present invention, this easily openable vessel lid is equipped with a sealing groove (11) along its periphery with a circumferential rim (counter sink) (10) to be interconnected with the inside of the cylindrical member a can (the body cylinder) interposed in between, and there is provided inside of said circumferential rim (10) a score (7) outlining the section to be opened. In this openable section (12) there is formed a rivet (13) which is formed by forming the vessel lid material into a protrusion toward the outside of the vessel lid, and a pull tab (14) is fixed as described hereunder by riveting said rivet (13). That is to say, the pull tab (14) has at its one end an opening tip (15) and at the other end a holding ring (16), and there is located near the opening tip (15) a fulcrum area (17) fixed by the rivet (13). The pull tab (14) is provided at a position such that its opening tip (15) is close enough to the point where the opening starts in the score (7).

The aforementioned sealing groove (11) is lined with a sealing compound (sealant) (18) consisting of a sealing rubber compound, so that an air-tight seal is given to the gap between the groove and the flange on the body cylinder.

In opening the vessel lid, the holding ring (16) on the pull tab (14) is held and lifted up. By this action, the opening tip (15) in the pull tab (14) is pushed down to initiate the shearing of a part of the score (7). Next, by holding and pulling upward the ring (16), the remaining part of the score (7) is broken so that opening is performed easily.

The shape of the vessel lid illustrated in this Figure is of an easily openable vessel lid of the full open type. However, it applies to easily openable vessel lid of the partial open type, too.

Figures 6, 7:
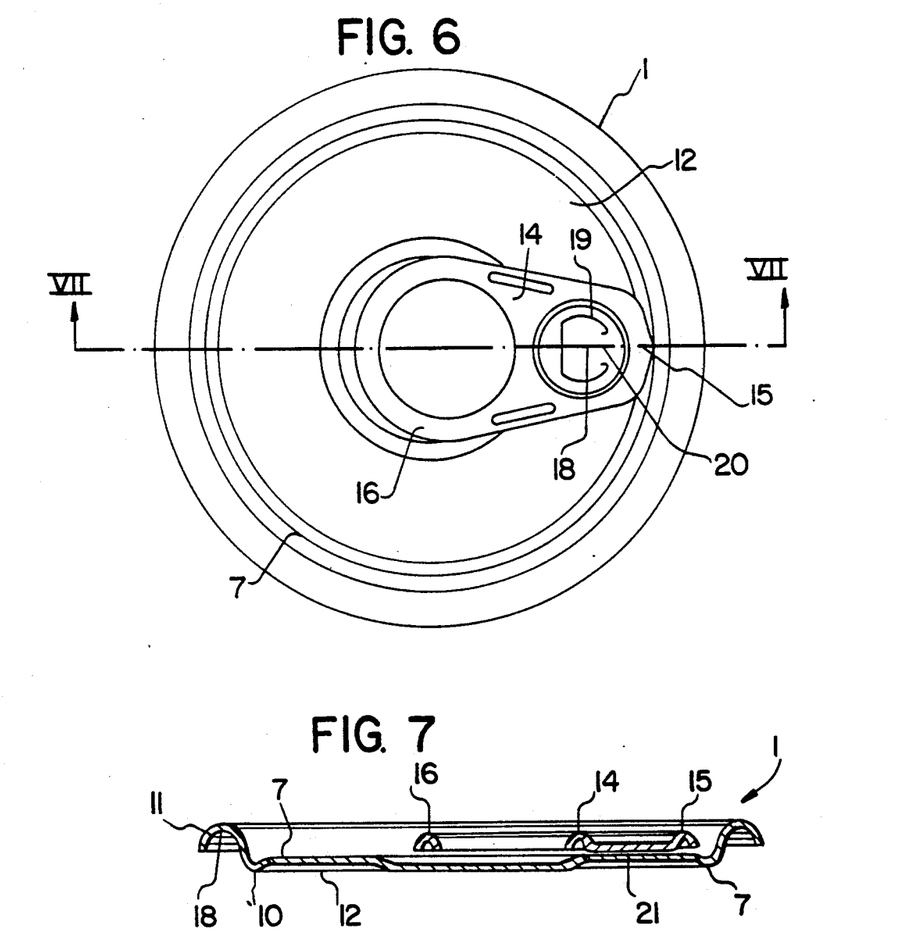
FIG. 6 is the top view of the other example of the easily openable vessel lid of the present invention.
FIG. 7 is a cross-sectional view of the easily openable vessel lid along a line VII—VII shown in FIG. 6.

In FIG. 6 (the top view) and FIG. 7 (the cross-sectional side view) which illustrate the constructions of other examples of the easily openable vessel lid of the present invention, the parts which are common to those shown in FIG. 4 and FIG. 5 are given identical reference numbers. In this vessel lid, there is provided instead of the rivet a fulcrum area (18) which is bonded to the vessel lid in the pull tab (14). Namely, there is a notch (19) having a shape resembling the letter U between the tip (15) and the ring (16) there if a connecting part (20) between the fulcrum area (18) and the tip (15) to form a tongue. The tongue-shape fulcrum (18) is attached to the openable area (12) in the body of the vessel lid with the adhesive layer (21).

Base Metal

In the present invention, all such metallic material that have been used for the conventional easily openable vessel lid, such as various aluminum sheets and various steel sheets, may be used.

Examples of the aluminum materials which can be used include pure aluminum and aluminum alloys consisting of aluminum and small amounts of alloy-use metals, such as magnesium and manganese. Since ordinary aluminum materials are electrochemically inferior to steel, if the two metals co-exist in an electrolytic system, corrosion progresses in aluminum. It is for the aforementioned reason that in the present invention aluminum alloys containing 0 to 08% by weight of Cu, 0 to 2.8% by weight of Mg, 0 to 1.5% by weight of Mn, 0 to 0.5% by weight of Fe, 0 to 0.5% by weight of Si are used as the aluminum material so that corrosion in the aforementioned electrolytic system can be effectively prevented. It is preferable from the corrosion resistance viewpoint that Cu contained as an alloy component be in the range of from 0% to 0.8%, particularly preferably in the range of from 0.05% to 0.4%. This Cu acts to cause the aluminum material to be in the electrochemically superior state, thus preventing corrosion of Cu-aluminum system effectively. Moreover, it is preferable from the corrosion resistance viewpoint that the Mg content be in the range of from 0 to 2.8% by weight, since if the Mg content exceeds 2.8%, pinholes tend to be formed when the aluminum material is coupled with steel. It is preferable from the workability viewpoint that the Mn content be in the range of from 0% to 1.5% by weight, since if the content exceeds 1.5% by weight, fabrication including riveting becomes difficult.

It is preferable that the thickness of the aluminum material be generally in the range of from 0.20 mm to 0.50 mm, or more preferably 0.23 mm to 0.30 mm, although the optimum thickness depends on the size or the like of the vessel lid. It is generally preferable that a surface treated film is formed on the surface of the aluminum material from the viewpoint of achieving good adhesion of the lining material to the aluminum material and corrosion resistance. Desirable examples of the surface treatment include chromate treatment, zirconium treatment, phosphoric acid treatment, polyacrylic acid treatment, and anode oxidation treatment. There can be cited as an example of the formation of a surface treated film a chromate treated film, which depends on the known method, such as by first carrying out degreasing and slightly etching the aluminum material with caustic soda and then chemically treating the material by immersing it in a solution consisting of 4 g of CrO$_3$/liter, 12 g of H$_3$PO$_4$/liter, 0.65 g of F/liter and the balance being water. It is preferable from the viewpoint of achieving good adhesion of the lining material that the thickness of the chromate treated film$_2$ be in the range of from 5 to 50 mg/m$^2$, more preferably from 10 mg/m$^2$ to 35 mg/m$^2$, in terms of the weight of Cr atom per unit area.

As the various steel sheets, on the other hand, there can be mentioned chromate surface treated steel sheet, particularly, electrolytically chromic acid treated steel sheet, chromate treated nickel galvanized steel sheet, chromate treated iron-tin alloy galvanized steel sheet, chromate treated tin-nickel alloy galvanized steel sheet, chromate treated iron-tin-nickel alloy galvanized steel sheet, chromate treated aluminum plated steel sheet, and chromate treated tin-plate. The thickness of the steel substrate is determined in light of the buckling strength, workability and openability. It is, however, preferable that it generally be in the range of from 0.1 mm to 0.4 mm, more preferably from 0.12 mm to 0.35 mm.

Of those kinds of the steel sheets mentioned above, the electrolytically chromic acid treated steel sheet is most preferable, while its steel substrate is provided with a metallic chromate layer and and a mon-metallic chromate layer over said metallic chromate layer. The thickness of the metallic chromate layer is determined in light of the corrosion resistance and workability, and it is preferable that the quantity be in the range of from 30 mg/m$^2$ to 300 mg/m$^2$, more preferably from 50 to 250 mg/m$^2$. Moreover, it is preferable that the thickness of the non-metallic chromate layer, which related with the adhesion of the coating and the peel strength, be in the range of from 4 mg/m$^2$ to 40 mg/m$^2$, more preferably from 7 mg/m$^2$ to 30 mg/m$^2$.

Biaxially Drawn Polyester Film

The laminate to constitute the vessel lid in the present invention is characterized in that the polyester film in the laminated state has an X-ray diffraction intensity ratio satisfying aforementioned formula (1) and an anisotropy index of in-plane crystal orientation of 30 or less. This film is prepared by forming a polyester composed mainly of ethylene terephthalate units into a film by the T-die method or the inflation film-forming method, sequentially or simultaneously biaxially drawing the film, and thermally setting the drawn film. The film so formed is laminated on a metallic material. In the preparation of the drawn film and the laminate, conditions are so controlled that the aforementioned properties may be controlled in the ranges specified in the present invention.

Controlling of $I_A/I_B$ $I_A/I_B$ can be controlled by adjusting the composition, the draw ratio in the film forming, the heat setting temperature after the drawing of the film, the lamination temperature whereat the film is laminated on the metallic sheet and heat treatment of the laminate. For example, if the draw ratio at the film-drawing step is increased, $I_A/I_B$ is increased, and at the same draw ratio, if the heat set temperature after the drawing is elevated, $I_A/I_B$ can be reduced, and if the lamination temperature at the step of laminating the film on the metallic sheet is elevated, $I_A/I_B$ is reduced. Moreover, if the laminate is heat-treated at a temperature close to the melting point of the polyester film, $I_A/I_B$ is furthermore reduced.

Moreover, the absolute value of $I_A/I_B$ can be furthermore reduced in the case of copolymerized polyester such as polyethylene terephthalate/isophthalate, and polyethylene terephthalate/sebacate than in the case of homopolymer of polyethylene terephthalate.

Controlling of Anisotropy Index of In-plane Crystal Orientation

The anisotropy index of the in-plane crystal orientation can be controlled by adjusting the difference between the draw ratio in the longitudinal or machine (MD) direction and the draw ratio in the traverse (TD) direction at the film drawing step and the heat setting temperature after the drawing. For example, if the difference between the draw ratio in the MD direction is decreased, the anisotropy index is reduced, and if the heat setting temperature is lowered, the anisotropy can be maintained at a low level.

The drawing of the film is generally carried out at a temperature of 80 to 110 Deg. C. and the draw ratio is selected according to the kind of the polyester and other conditions so that the area draw ratio is 2.5 to 16.0, especially 4.0 to 14.0, and that $I_A/I_B$ is within the aforementioned range and the anisotropy index is 30 or less.

The heat setting of the film is carried out at a temperature of 130 to 240 Deg. C., especially 150 to 230 Deg. C., so that the aforementioned conditions may be satisfied.

The starting polyester will now be described. Even polyethylene terephthalate per se can be used under much restricted conditions of drawing, heat setting, and lamination. However, in order to obtain the aforementioned characteristics, lowering of the attainable highest crystallization degree of the polyester film is advantageous, and for this purpose, it is preferred that units of a copolymerization ester other than ethylene terephthalate be introduced into the polyester. In the present invention, use of a biaxially drawn film of a copolymer composed mainly of ethylene terephthalate units, which contains a small amount of other ester units and has a melting point of 210 to 252 Deg. C., is especially preferred. Incidentally, the melting point of homopolyethylene terephthalate is 255 to 265 Deg. C.

In the copolyester used in the present invention, it is generally preferred that the at least 70 mole %, especially at least 75 mole %, of the dibasic acid component be terephthalic acid, at least 70 mole %, especially at least 75 mole %, of the diol component be ethylene glycol, and 1 to 30 mole %, especially 5 to 25 mole %, of the dibasic acid component and/or the diol component be a dibasic acid other than terephthalic acid and/or a diol other than ethylene glycol.

As the dibasic acid other than terephthalic acid, there can be used at least one member selected from aromatic dicarboxylic acids such as isophthalic acid, phthalic acid and naphthalene-dicarboxylic acid; alicyclic dicarboxylic acid such as cyclohexane-dicarboxylic acid; and aliphatic dicarboxylic acids such as succinic acid, adipic acid, sepbacic acid and dodecanedioic acid. As the diol component other than ethylene glycol, there can be used at least one member selected from propylene glycol, 1,4-butane-diol, diethylene glycol, 1,6-hexylene glycol, cyclohexane dimethanol and ethylene oxide adduct of bisphenol A. Of course, these comonomers should be so combined that the melting point of the copolyester is within the aforementioned range.

The copolyester used should have a film forming molecular weight. For this purpose, a copolyester having an intrinsic viscosity (I.V.) of 0.55 to 1.9 dl/g, especially 0.65 to 1.4 dl/g, is preferably used.

It is important that the copolyester film should be biaxially drawn. The degree of the biaxial orientation can be determined according to the polarization fluorescence method, the birefringence method, the density gradient tube method and the like.

In order to attain a good balance between the barrier property to corrosive components and the workability, it is preferred that the thickness of the film be 8 to 50 microns, especially 12 to 40 microns.

Known film additives, for example, anti-blocking agents such as amorphous silica, pigments such as titanium dioxide (titanium white), antistatic agents and lubricants can be incorporated into this biaxially drawn film according to known recipes.

At the lamination step, the time required for the film to be laminated to pass through the crystallization temperature zone should be made as short as possible, and it is preferred that the film be passed through this crystallization temperature zone within 10 seconds, especially within 5 seconds. For this purpose, at the lamination step, only the base metal is heated and immediately after the lamination, the laminate is forcibly cooled. Direct contact with cold air or pressing contact with a cooling roller which is forcibly cooled is adopted for this cooling. It should be understood that if the film is heated at a temperature close to the melting point at the lamination step and the film is rapidly cooled after the lamination, the crystal orientation degree thus can be moderated.

Moreover, in cases where a top coating is applied to the film surface, a thermosetting coating having a high curing speed is used so that the baking of the top coating can be carried out at a lowest possible temperature within a shortest time.

In the case where an adhesive primer is used, in order to increase the adhesion of the film to the adhesive primer, it is generally preferred that the surface of the biaxially drawn copolyester film be subjected to corona discharge treatment. Preferably, the degree of the corona discharge treatment is such that the wet tension of the treated film is at least 44 dyne/cm.

Furthermore, for the improvement of adhesion the film can be subjected to a known surface treatment such as plasma treatment or flame treatment, or a known coating treatment with a urethane resin or a modified polyester resin.

Adhesive Primer

An adhesive primer is interposed between the polyester film and the base metal, if desired, and this adhesive primer has an adhesion to both of the base metal and the film. As a typical instance of the primer coating having excellent adhesion and corrosion resistance, there can be mentioned a phenol-epoxy coating comprising a resol type phenol-aldehyde resin derived from a phenol and formaldehyde and a bisphenol type epoxy resin at a phenolic resin/epoxy resin weight ratio of from 50/50 to 5/95, especially from 40/60 to 10/90.

It is generally preferred that the adhesive primer layer be formed in a thickness of 0.3 to 5 microns.

Top Coating Layer

As the top coating layer consisting of thermosetting resin which is provided on the surface of the film, if so desired, there can be mentioned thermosetting resin-based coating material conventionally used for the vessel, especially a phenolaldehyde resin, a furan resin, a xylene-formaldehyde resin, a ketone-formaldehyde resin, a urea resin, a melamine resin, an aniline resin, an alkyd resin, a guanamine resin, an unsaturated polyester resin, an epoxy resin, a thermosetting acrylic resin, a triallyl cyanurate resin, bismaleimide resin, an oledoresinous coating, a thermosetting acrylic coating and a thermosetting vinyl coating. Either one of these or a mixture or two or more thereof can be used.

Of these thermosetting resin-based coating materials mentioned above, with respect to the ability to be baked at a lower temperature within a shorter time, epoxy-urea coating, epoxy-modified vinyl coating, low temperature-type epoxy-phenol coating and hydroxyl group polyester-epoxy coating are particularly preferred.

It is preferable that the top coat layer has a thickness of 1 to 10 microns. Moreover, this top coat layer may be impregnated with a lubricant in advance for preventing injuries otherwise liable to occur while the material is in transit.

Preparation Process

According to one embodiment of the present invention, the biaxially drawn polyester film and base metal are press-bonded and laminated under such conditions that only the surface layer portion of the film contiguous to the base metal is melted. According to this embodiment, the base metal is preliminarily heated at a temperature higher than the softening point of the polyester and immediately after the lamination, the laminate is rapidly quenched.

According to another embodiment of the present invention, the biaxially drawn polyester film and the base metal are press-bonded and laminated through an adhesive layer formed on one of them.

According to a preferred embodiment of the present invention, a laminated sheet for a vessel lid is prepared by a process comprising the steps of coating a thermosetting adhesive primer such as an epoxy type primer on one surface of a biaxially drawn polyester film, laminating the polyester film on a base metal at such a positional relation that the adhesive primer layer confronts the base metal, and, if necessary forming an outer surface-protecting coating film on the surface, to be formed into an outer face of the vessel lid, of the base metal.

There can be adopted a method in which both the inner and outer surface of the laminate sheet are simultaneously coated by a coil coater and the laminate sheet is subjected to a baking treatment to simultaneously cure the adhesive layer and the outer surface-protecting coating.

According to another preferred embodiment of the present invention, a laminate sheet for a vessel lid is prepared by a process comprising the steps of coating a thermosetting adhesive primer such as an epoxy primer on a surface of a biaxially drawn polyester film, applying the coated polyester film to at least one surface of a base metal at such a positional relation that the adhesive primer layer confronts the base metal and heat-treating the obtained laminate under such conditions that the thermosetting resin film of the adhesive primer layer is cured.

The easily openable vessel lid of the present invention can be prepared according to known procedures except that the aforementioned laminate is used. To describe this procedure, the laminate sheet is punched out in a circular disk shape in the press forming step (A) and then the disk is formed into the desired shape.

Next, in the score stamping step (B), scoring is carried out using a score die in such a manner that the score reaches from the external side of the vessel lid a midway depth of the thickness of the base metal. The ratio of remaining thickness of the metallic material after scoring ($t_2$) to the unscored thickness of the metallic material ($t_1$) is preferably 10 to 50% ($t_2/t_1 \times 100$) and the unscored thickness of the metallic material is preferably 20 to 150 microns.

It is essential with view to preventing occurrence of injuries to the film layer that the width of the score at its bottom (d) is 75 microns or less, or more preferably 50 microns.

In the rivet forming step (C), a rivet is formed using a rivet forming die such that the rivet protrudes outward in the openable area outlined by the score and in the tab attaching step (D) a pull tab is fitted over the rivet and the tab is fixed by riveting the protrusion of the rivet.

In case of the bonded tab instead of the rivet forming step (C), an adhesive such as nylon-base adhesive tape is applied to the openable area or the tab is heat bonded to the openable area in the tab fixing step.

Finally, in the lining step (E), a sealing compound is applied through a nozzle to the sealing groove in the vessel lid as the lining and the sealing compound is dried into a seal layer.

The lapped lock seaming step to connect this vessel lid to the can body will now be described. The flange on the cylindrical member of a can is fitted over the sealing groove of the easily openable vessel lid and then the groove is subjected to the primary lock seaming by the crimping roller around the flange. Next, in the secondary lock seaming step, this flange part is further crimped to a 90 Deg. angle along the side wall of the can body.

As the material for the can body, there are preferably used materials for the can body of the three piece can constructed of tin-free steel (TFS, electrolytically chromic acid treated steel sheet) which has a seam formed by bonding with an adhesive (nylon-base adhesive) or welding on its side wall and has flanges at its upper and lower ends for the lapped lock seaming or TFS can body for so-called three piece can which is formed by drawing or deep drawing.

Besides, the vessel lid of the present invention is equally applicable to the can body for the three piece can formed from a tin-plated steel sheet (tin-plate) and has a seam made by soldering or welding and the seamless cylindrical member constructed of so-called tin-plate formed by spinning, deep draw and impact extrusion.

Measurement of $I_A/I_B$, the metal exposure on the inside surface of the vessel lid, evaluation of feathering, packing tests and the evaluation of openability were performed through Examples and Comparative Examples according to the following procedures:

(1) Measurement of $I_A/I_B$

A disk having a 35 mm diameter was but out from the flat part in the center of the vessel lid and was used as the test specimen for the X-ray diffractometric analysis. Using an X-ray diffractometer, the measurement was conducted as follows:

Copper (wavelength lambda = 0.1542 nm) is used for target, the tube voltage and current are about 30 KV and about 100 mA, and a light-receiving slit having a slit width smaller than 0.1 Deg. expressed as the angle, is selected so that the two diffraction peaks of the diffraction place having a spacing of about 0.39 nm (2 theta is about 22.5 Deg.) and the diffraction plane having a spacing of about 0.34 (2 theta is about 26 Deg.) can be separated from each other. The sample is attached so that each of the incident and reflection angles of the X-ray is theta and the incident X-ray and the diffracted X-ray are symmetric with each other with respect to the normal line to the film plane (the diffraction angle is 2 theta), and while the incident angle theta and the reflection angle theta are always kept equal to each other, the X-ray diffraction spectrum is measured by scanning over the diffraction angle 2 theta range of from 20 to 30 Deg.

An example of the measurement is shown in FIG. 2.

The integrated intensities (peak areas) $I_B$ and $I_A$ of the diffraction of the diffraction plane having a spacing of about 0.39 nm (2 theta is about 22.5 Deg.) and the diffraction of the diffraction plane having a spacing of about 0.34 nm (2 theta is about 26) are determined, and the intensity ratio $I_A/I_B$ is calculated. As shown in FIG. 2, straight lines are drawn as backgrounds between the intensities at 2 theta = 24 Deg. and 2 theta = 28 Deg. and between the intensities at 2 theta = 21.5 and 2 theta = 24 Deg., and in the diagram where the backgrounds are thus drawn, the intensities correspond to the hatched portions.

(2) Evaluation of the Metal Exposure on the Internal surface of the vessel lid (the metal exposure of the score and the metal exposure of the area other than the score)

The degree of the metal exposure was determined in the value of electric current flowing between the internal surface of the vessel lid as the anode and a stainless steel plate as the cathode immersed in a 1% aqueous solution of salt as the electrolyte on which an electric potential of 6.3 volts was imposed. When the scored part was subjected to the test, the area other than the scored part was sealed with paraffin. When the area other than the scored part was subjected to the test, the scored part was sealed with paraffin. Measurements were taken from 50 specimens for each test item.

(3) Evaluation of Feathering

Occurrence of feathering was evaluated between easily openable vessel lid which have undergone retort sterilized (for 90 minutes at 115 Deg. C.) on one hand and easily openable vessel lid which were not yet retort sterilized on the other by opening the vessel lid. Measurements were taken from 50 specimens for each test item.

(4) Pack Test I

Water boiled salmon/trout meat was packed into an ordinary food package-use welded can body and the easily openable vessel lid was connected to the can body by the conventional method, and the packed can was sterilized for 90 minutes at 115 Deg. C. After the packed can had been stored for 3 months at 50 Deg. C., the connected part was cut off by a can opener. The vessel lid separated from the can body was examined under microscope for the extent of corrosion and pinholes. Measurements were taken from 50 specimens.

(5) Pack Test II

Seasoned bonito tuna meat was packed into an ordinary food package-use welded can body and the easily openable vessel lid was connected to body of the can by the conventional method, and the packed can was sterilized for 90 minutes at 115 Deg. C. Then, the can was dropped sideways from a 60 cm height in the laidflat posture onto an iron block. After the packed can had been stored for 3 months at 50 Deg. C., the connected part was but off by a can opener. The vessel lid separated from the can body was examined under microscope for the extent of corrosion and pinholes. Measurements were taken from 50 specimens.

(6) Evaluation of the Openability

Easily openable vessel lid was evaluated as for their openability after they had undergone retort sterilization (immersed in boiling water for 90 minutes at 115 Deg. C.). The evaluation was made by the ratio of the vessel lid which failed to be opened due to breakage of the pull tab or the like to the number of the vessel lid opened.

Biaxially drawn polyester films were prepared according to the following procedures.

Each of polyesters shown in the examples given hereinafter was melt-extruded in the form of a film at a temperature of 270 Deg. C. to 315 Deg. C. from a die slit, and was cooled and solidified on the surface of a cooling drum maintained at a temperature of 60 Deg. C. to 80 Deg. C. to obtain an amorphous polyester film. This amorphous polyester film was supplied between a pair of rollers differing in the peripheral speed and was longitudinally drawn at a temperature of 80 Deg. C. to 90 Deg. C. at a longitudinal draw ratio shown in Table A. Then, the film was laterally drawn at a temperature of 95 Deg. C. to 110 Deg. C. at a lateral draw ratio shown in Table A by a tenter. The drawn polyester film was then thermally set in a heating chamber maintained at a temperature shown in Table A. Then, the film was rapidly cooled.

The obtained thermally set film (having a width of 1 m) was slit at points 20 cm apart from both the ends, and an end film (E) and a center film (C) were used for the lamination.

EXAMPLE 1

Adhesive Primer Coating

A mixed phenol comprising 75% by weight of bisphenol A and 25% by weight of p-cresol was reacted with formaldehyde in the presence of a basic catalyst, and the reaction product was purified and dissolved in a solvent to form a solution of a resol type phenolformaldehyde.

A solution of a bisphenol A type epoxy resin (Epikote 1009; the average molecular weight 3750; the equivalent weight as epoxy 2650) was mixed with the above solution of the resol type phenolformaldehyde resin at a solid weight ratio of 70/30, and precondensation was carried out to form an adhesive primer coating.

Coating on the Internal Surface

Resol-type phenolic resin obtained by reacting bisphenol A with formalin in the presence of ammonium was mixed with bisphenol-type epoxy resin (Epikote 1009; the equivalent weight as epoxy 2650) in a mixed solvent consisting of ketones, esters and alcohols at a solid weight ratio of 15/85, and precondensation was carried out to form an internal surface coating material for 2 hours at 80 Deg. C.

Preparation of Coated Laminate Material

The aforementioned adhesive primer coating was coated in an amount of 10 mg/dm$^2$ as solid on one surface of a biaxially drawn polyethyleneterephthalate/isophthalate (the mole fraction) of ethylene isophthalate 16%, the melting point 225 Deg. C.) copolyester film having a thickness of 23 microns, and the coated film was dried at 120 Deg. C. A commercially available aluminum sheet used for the vessel lid of a can (a thickness of 0.3 mm, 5052H38, surface treated with Arojin 401-45, chrominum 20 mg/m$^2$) was heated to 215 Deg. C. and the aforementioned polyester copolymer film was supplied onto one side of the aluminum material so that the aluminum material will face with the adhesive primer layer. The two parts were hot pressed into a laminate. The laminate was then cooled with water. The aforementioned internal surface coating material was applied onto the film surface using a roll coater so that the amount of coating will be 40 mg/dm$^2$ as solid, and baking was carried out for 10 minutes at 195 Deg. C. Next, the epoxy-urea coating was applied onto the uncoated aluminum surface of the laminated sheet using a roll coater so that the amount of coating will be 45 mg/dm$^2$ as solid, and baking was carried out for 10 minutes at 195 Deg. C.

Preparation of Vessel Lids

From the obtained bake coated laminate sheet, a disk of a 82 mm diameter was punched out so that the internal surface protective coating will be positioned at the internal side of the vessel lid. This vessel lid was scored for the full open type from the external side of the vessel lid (the diameter is 79 mm and the remaining thickness of the score is 95 microns) and underwent the rivet forming and the pull tab attaching step, and thus was prepared an easily openable vessel lid.

The obtained coated laminate material and the easily openable vessel lid were subjected to measurement of $I_A/I_B$, evaluation of the metal exposure of the internal side of the vessel lid, evaluation of feathering, pack tests and evaluation of the openability. Test results are shown in Table 1.

EXAMPLE 2

The vessel lid was prepared in the same procedures as in Example 1 and same tests were carried out as in Example 1 except that a polyethylene terephthalate/sebacate copolymerized polyester film (the mole fraction of the ethylene sebacate content is 11%) was used as a polyester film and the lamination temperature was changed to 230 Deg. C. Test results are shown in Table 1.

EXAMPLE 3

The vessel lid was prepared in the same procedures as in Example 1 and same tests were carried out as in Example 1 except that a polyethylene terephthalate/isophthalate copolymerized copolyester film (the mole fraction of the ethylene isophthalate content is 5%) whose melting point is higher than polyester was used as a polyester film and the lamination temperature was changed to 240 Deg. C. Test results are shown in Table 1.

EXAMPLE 4

The vessel lid was prepared in the same procedures as in Example 1 and same tests were carried out as in Example 1 except that a polyethylene terephthalate/sebacate copolymerized copolyester film (the mole fraction of the ethylene sebacate content is 4%) whose melting point is higher than polyester was used as a polyester film and the lamination temperature was changed to 245 Deg. C. Test results are shown in Table 1.

EXAMPLE 5

The vessel lid was prepared in the same procedures as in Example 1 and same tests were carried out as in Example 1 except that a polyethylene terephthalate film (the melting point is 259 Deg. C.) was used as a polyester film and the lamination temperature was changed to 259 Deg. C. Test results are shown in Table 1.

COMPARATIVE EXAMPLE 1

The vessel lid was prepared in the same procedures as in Example 1 and same tests were carried out as in Example 1 except that a polyethylene terephthalate/sebacate copolymerized copolyester film (the mole fraction of the ethylene sebacate content is 5%) was used as a polyester film and the lamination temperature was changed to 240 Deg. C. Test results are shown in Table 1.

COMPARATIVE EXAMPLE 2

The vessel lid was prepared in the same procedures as in Example 1 and the same tests were carried out as in Example 1 except that a polyethylene terephthalate/isophthalate copolymerized copolyester film (the mole fraction of the ethylene isophthalate content is 5%) was used as a polyester film and the lamination temperature was changed to 245 Deg. C. Test results are shown in Table 1.

COMPARATIVE EXAMPLE 3

The vessel lid was prepared in the same procedures as in Example 1 and same tests were carried out as in Example 1 except that a polyethylene terephthalate film (the melting point is 258 Deg. C.) was used as a polyester film and the lamination temperature was changed to 250 Deg. C. Test results are shown in Table 1.

COMPARATIVE EXAMPLE 4

The vessel lid was prepared in the same procedures as in Example 1 and same tests were carried out as in Example 1 except that a polyethylene terephthalate film was used as a polyester film and the lamination temperature was changed to 250 Deg. C. Test results are shown in Table 1.

EXAMPLE 6

The vessel lid was prepared in the same procedures as in Example 1 and same tests were carried out as in Example 1 except that a polyethylene terephthalate/sebacate copolymerized copolyester film (the mole fraction of the ethylene sebacate is 12%) was used as a polyester film, the lamination temperature was changed to 230 Deg. C. and the baking temperature for the coating on the internal surface was changed to 205 Deg. C. Test results are shown in Table 1.

EXAMPLE 7

The vessel lid was prepared in the same procedures as in Example 6 and same tests were carried out as in Example 1 except that the lamination temperature was changed to 230 Deg. C. and the baking temperature for the coating on the internal surface was changed to 215 Deg. C. Test results are shown in Table 1.

COMPARATIVE EXAMPLE 5

The vessel lid was prepared in the same procedures as in Example 6 and same tests were carried out as in Example 1 except that the lamination temperature was changed to 230 Deg. C. and the baking temperature for the coating on the internal surface was changed to 240 Deg. C. Test results are shown in Table 1.

COMPARATIVE EXAMPLE 6

The vessel lid was prepared in the same procedures as in Example 6 and same tests were carried out as in Example 1 except that the lamination temperature was changed to 230 Deg. C. and the baking temperature for the coating on the internal surface was changed to 270 Deg. C. Test results are shown in Table 1.

EXAMPLE 8

The vessel lid was prepared in the same procedures as in Example 1 and same tests were carried out as in Example 1 except that a polyethylene terephthalate/isophthalate copolymerized copolyester film (the mole fraction of the ethylene isophthalate content is 20%) was used as a polyester film and the scoring of the full open type was changed to the partial opening type. Test results are shown in Table 1.

EXAMPLE 9

The vessel lid was prepared in the same procedures as in Example 1 and same tests were carried out as in Example 1 except that a polyethylene terephthalate/sebacate copolymerized copolyester film (the mole fraction of the ethylene sebacate content is 5%) was used as a polyester film, and the lamination temperature was changed to 240 Deg. C. and the scoring of the full open type was changed to the partial opening type. Test results are shown in Table 1.

COMPARATIVE EXAMPLE 7

The vessel lid was prepared in the same procedures as in Example 1 and same tests were carried out as in Example 8 except that a polyethylene terephthalate/isophthalate copolymerized copolyester film (the mole fraction of the ethylene isophthalate content is 25%) was used as a polyester film and the lamination temperature was changed to 190 Deg. C. Test results are shown in Table 1.

COMPARATIVE EXAMPLE 8

The vessel lid was prepared in the same procedures as in Example 1 and same tests were carried out as in Example 8 except that a polyethylene terephthalate film was used as a polyester film and the lamination temperature was changed to 250 Deg. C. Test results are shown in Table 1.

EXAMPLE 10

The vessel lid was prepared in the same procedures as in Example 1 and same tests were carried out as in Example 8 except that the lamination temperature was changed to 215 Deg. C., the thermosetting internal surface coating was not applied and the bake coating treatment at 195 Deg. C. for 10 minutes for the internal coating was not carried out. Test results are shown in Table 1.

EXAMPLE 11

Onto one side of an electrolytically chromic acid treated steel sheet having a thickness of 0.20 mm and a temperature degree of T-4, of which the surface treated coating containing a metallic chromium of 100 mg/m² and the non-metallic chromium layer having a chromium content of 15 mg/m², the epoxy-phenol adhesive primer coating cited in Example 1 was applied so that the coating will amount to 10 mg/dm² as solid and the coated sheet was dried. Then, a biaxially drawn polyethylene terephthalate/isophthalate copolymerized copolyester film (the mole fraction of the ethyleneisophthalate content is 20%) having a thickness of 25 microns was heat laminated onto the coated sheet at 215 Deg. C., and the laminate was cooled with water immediately after the lamination step, and was dried.

Next, an epoxy-phenol coating was applied using a roll coater onto the surface of the steel sheet not laminated with the polyester film so that the amount of coating will be 50 mg/dm² as solid, and the coated sheet was baked at 200 Deg. C. for 10 minutes.

From the obtained electrolytically chromic acid treated steel sheet which has its one side laminated with the film and the other side coated, a disk of a 85 mm diameter was punched out so that the film laminated side will face to the internal side. A sealing compound was applied onto the curled part of the vessel lid by the conventional method and the vessel lid was dried. Next, an easily openable vessel lid was prepared by scoring the vessel lid from the external side for the full open type score of a 58 mm diameter (the remaining thickness of the score is 55 microns) and underwent the rivet forming and the pull tab attaching step, and thus was prepared an easily openable vessel lid.

The obtained coated laminate material and the easily openable vessel lid were subjected to measurement of $I_A/I_B$, evaluation of the metal exposure of the internal side of the vessel lid, evaluation of feathering, pack tests and evaluation of the openability. Test results are shown in Table 1.

EXAMPLES 12, 14, 16 and 18

The vessel lids were prepared in the same procedures as in Example 11 and same tests were carried out as in Example 11 except that biaxially drawn polyethylene terephthalate/sebacate copolymerized polyester films (the mole fraction ratios of the ethylene sebacate content were 14%, 12%, 10% and 5%, respectively) were used and the heat lamination temperatures are 230 Deg. C., 235 Deg. C., 240 Deg. C. and 240 Dec., respectively. Test results are shown in Table 2.

EXAMPLES 13, 15, 17 and 19

The vessel lids were prepared in the same procedures as in Example 11 and same tests were carried out as in Example 11 except that the mole fractions of ethylene isophthalate content are 14%, 12%, 10% and 5% and the lamination temperatures are 220 Deg. C., 230 Deg. C., 230 Deg. C. and 240 Deg., respectively. Test results are shown in Table 2.

EXAMPLE 20

The vessel lid was prepared in the same procedures as in Example 11 and same tests were carried out as in Example 11 except that the biaxially drawn polyethylene terephthalate film was used and the heat lamination temperature was 240 Deg. C. Test results are shown in Table 2.

COMPARATIVE EXAMPLES 9, 14, 16 and 18

The vessel lids were prepared in the same procedures as in Example 11 and same tests were carried out as in Example 11 except that the mole fractions of ethylene isophthalate content are 3%, 25%, 10% and 12% and the lamination temperatures are 250 Deg. C., 190 Deg. C., 230 Deg. C., and 230 Deg., respectively. Test results are shown in Table 2.

COMPARATIVE EXAMPLES 10, 15 and 17

The vessel lids were prepared in the same procedures as in Example 11 and same tests were carried out as in Example 11 except that biaxially drawn polyethylene terephthalate/sebacate copolymerized copolyester films (the mole fractions of the ethylene sebacate content were 3%, 30%, and 10%, respectively) were used and the heat lamination temperatures were 250 Deg. C., 190 Deg. C., and 250 Deg., respectively. Test results are shown in Table 2.

COMPARATIVE EXAMPLES 11, 12 and 13

The vessel lids were prepared in the same procedures as in Example 11 and same tests were carried out as in Example 11 except that biaxially drawn polyethylene terephthalate was used and the heat lamination temperatures were 250 Deg. C., 250 Deg. C., and 250 Deg., respectively. Test results are shown in Table 2.

From Examples 1 to 10 and Comparative Examples 1 to 8, the vessel lids having an anisotropy index of 9 and $I_A/I_B$ falling within the range of from 4 to 17 are superior to the can ends having $I_A/I_B$ either less than 4 or in excess of 17 with respect to the metal exposure of the interior surface of the vessel lid, feathering, corrosion resistance and openability.

Moreover, from Examples 11 to 20 and Comparative Examples 9 to 18, the vessel lid having $I_A/I_B$ within the range of from 4 to 15 and an anisotropy index of 30 or less are superior to the can ends having $I_A/I_B$ either less than 4 or in excess of 17 with respect to the metal exposure of the interior surface of the can end, feathering, corrosion resistance.

TABLE A

| No. | Longitudinal draw ratio | Lateral draw ratio | Heat setting temp. (°C.) | Film position |
|---|---|---|---|---|
| Example | | | | |
| 1 | 3.0 | 3.1 | 205 | C |
| 2 | 3.0 | 3.1 | 216 | C |
| 3 | 3.0 | 3.1 | 200 | C |
| 4 | 3.6 | 3.7 | 205 | C |
| 5 | 3.6 | 3.7 | 210 | C |
| 6 | 3.0 | 3.1 | 218 | C |
| 7 | 3.0 | 3.1 | 225 | C |
| 8 | 3.0 | 3.1 | 200 | C |
| 9 | 3.6 | 3.7 | 198 | C |
| 10 | 3.0 | 3.1 | 205 | C |
| 11 | 3.0 | 3.1 | 205 | E |
| 12 | 3.0 | 3.1 | 220 | E |
| 13 | 3.0 | 3.1 | 210 | E |
| 14 | 3.0 | 3.1 | 220 | C |
| 15 | 3.0 | 3.1 | 205 | C |
| 16 | 3.0 | 3.1 | 205 | C |
| 17 | 3.0 | 3.1 | 190 | C |
| 18 | 3.0 | 3.1 | 200 | C |
| 19 | 3.4 | 3.5 | 200 | C |
| 20 | 3.4 | 3.5 | 200 | C |
| Comparative Example | | | | |

TABLE A-continued

| No. | Longitudinal draw ratio | Lateral draw ratio | Heat setting temp. (°C.) | Film position |
|---|---|---|---|---|
| 1 | 3.7 | 3.8 | 190 | C |
| 2 | 4.0 | 4.0 | 185 | C |
| 3 | 4.0 | 4.0 | 175 | C |
| 4 | 4.1 | 4.1 | 170 | C |
| 5 | 3.0 | 3.1 | 210 | C |
| 6 | 3.0 | 3.1 | 210 | C |
| 7 | 3.0 | 3.1 | 170 | C |
| 8 | 4.0 | 4.1 | 172 | C |
| 9 | 3.6 | 3.7 | 180 | C |
| 10 | 3.6 | 3.7 | 170 | C |
| 11 | 4.0 | 3.0 | 160 | C |
| 12 | 4.0 | 3.0 | 160 | E |
| 13 | 4.2 | 3.0 | 160 | E |
| 14 | 3.0 | 3.1 | 178 | C |
| 15 | 3.0 | 3.1 | 178 | C |
| 16 | 3.0 | 3.1 | 220 | E |
| 17 | 4.0 | 2.5 | 225 | E |
| 18 | 4.0 | 2.5 | 218 | E |

TABLE 1

| Example No. | Anisotropy index $I_A/I_B$ | Composition | Mole fraction of co-monomer (%) | Melting point Tm (°C.) | Metal exposure of the can end's inside surface (mA) scored part | Metal exposure of the can end's inside surface (mA) Non-scored area | Feathering opened at room temp. | Feathering sterilized in boiling water | Pack Test I corrosion resistance | Pack Test I pin holes yes or no | Openability, No. of tab breakage/No. of opening |
|---|---|---|---|---|---|---|---|---|---|---|---|
| 1 | 5.0 | 9.0 PET/I | 16 | 225 | 0.000 | 0.000 | No | No | No change | No | 0/200 |
| 2 | 9.2 | 9.0 PET/S | 11 | 246 | 0.000 | 0.000 | No | No | No change | No | 0/200 |
| 3 | 12.6 | 9.0 PET/I | 5 | 250 | 0.000 | 0.000 | No | No | No change | No | 0/200 |
| 4 | 15.6 | 9.0 PET/S | 4 | 255 | 0.000 | 0.000 | No | No | No change | No | 0/200 |
| 5 | 16.3 | 9.0 PET | 0 | 259 | 0.002 | 0.000 | No | No | Slight spot corrosion in scored part | No | 0/200 |
| 6 | 7.7 | 9.0 PET/S | 12 | 243 | 0.000 | 0.000 | No | No | No change | No | 0/200 |
| 7 | 4.5 | 9.0 PET/S | 12 | 243 | 0.000 | 0.092 | No | No | Slight spot corrosion in bead and rivet | No | 0/200 |
| 8 | 4.2 | 9.0 PET/I | 20 | 220 | 0.000 | 0.080 | No | No | Slight spot corrosion in bead and rivet | No | 0/200 |
| 9 | 14.7 | 9.0 PET/S | 5 | 250 | 0.000 | 0.000 | No | No | No change | No | 0/200 |
| 10 | 5.0 | 9.0 PET/I | 16 | 225 | 0.001 | 0.005 | No | No | Slight spot corrosion in bead, rivet and scored part | No | 0/200 |

| Comparative Example No. | Anisotropy index $I_A/I_B$ | Composition | Mole fraction of co-monomer (%) | Melting point Tm (°C.) | Metal exposure of the can end's inside surface (mA) scored part | Metal exposure of the can end's inside surface (mA) Non-scored area | Feathering opened at room temp. | Feathering sterilized in boiling water | Pack Test I corrosion resistance | Pack Test I pin holes yes or no | Openability, No. of tab breakage/No. of opening |
|---|---|---|---|---|---|---|---|---|---|---|---|
| 1 | 17.5 | 9.0 PET/S | 5 | 250 | 1.2 | 0.000 | Yes | Yes | Pin holes in scored part | Yes | 2/200 |
| 2 | 19.5 | 9.0 PET/I | 3 | 255 | 30 | 0.000 | Yes | Yes | Pin holes in scored part | Yes | 20/200 |
| 3 | 21.9 | 9.0 PET | 0 | 258 | 76 | 0.000 | Yes | Yes | Pin holes in scored part | Yes | 20/200 |
| 4 | 25.7 | 9.0 PET | 0 | 259 | 120 | 0.000 | Yes | Yes | Pin holes in scored part | Yes | 20/200 |
| 5 | 3.0 | 9.0 PET/S | 12 | 243 | 70 | 100 | No | No | Pin holes in rivet, bead and scored part | Yes | 0/200 |
| 6 | 2.5 | 9.0 PET/S | 12 | 243 | 9.00 | 43 | No | No | Pin holes in rivet, bead and scored part | Yes | 0/200 |
| 7 | 3.6 | 9.0 PET/I | 25 | 193 | 0.000 | 12 | No | No | Slight spot corrosion in bead and rivet | Yes | 0/200 |
| 8 | 23.5 | 9.0 PET | 0 | 259 | 88 | 0.000 | Yes | Yes | Pin holes in scored | Yes | 30/200 |

TABLE 1-continued part

TABLE 2

| Example No. | $I_A/I_B$ | Anisotropy index | Composition (1) | Mole fraction of co-monomer (%) | Melting point Tm (°C.) | Metal exposure of the can end's inside surface (mA) | | corrosion resistance | Pack Test II | | Feathering | |
|---|---|---|---|---|---|---|---|---|---|---|---|---|
| | | | | | | scored part | Non-scored part | | pinholes yes or no | corrosion at deformed part after dropping | opened at room temp. | sterilized in boiling water |
| 11 | 4.3 | 29.0 | PET/I | 20 | 220 | 0.000 | 0.095 | Slight spot corrosion in part of bead and rivet | No | No | No | No |
| 12 | 5.3 | 25.3 | PET/S | 14 | 238 | 0.000 | 0.000 | No change | No | No | No | No |
| 13 | 6.4 | 16.5 | PET/I | 14 | 227 | 0.000 | 0.000 | No change | No | No | No | No |
| 14 | 7.4 | 10.7 | PET/S | 12 | 243 | 0.000 | 0.000 | No change | No | No | No | No |
| 15 | 8.5 | 8.2 | PET/I | 12 | 233 | 0.000 | 0.000 | No change | No | No | No | No |
| 16 | 9.8 | 3.1 | PET/S | 10 | 246 | 0.000 | 0.000 | No change | No | No | No | No |
| 17 | 11.0 | 8.9 | PET/I | 10 | 240 | 0.000 | 0.000 | No change | No | No | No | No |
| 18 | 12.6 | 9.3 | PET/S | 5 | 250 | 0.001 | 0.000 | Slight spot corrosion in part of score | No | No | No | No |
| 19 | 14.3 | 9.0 | PET/I | 5 | 252 | 0.002 | 0.000 | Slight spot corrosion in part of score | No | No | No | No |
| 20 | 15.0 | 7.8 | PET | 0 | 259 | 0.002 | 0.000 | Slight spot corrosion in part of score | No | No | NO | No |

| Comparative Example No. | $I_A/I_B$ | Anisotropy index | Composition (1) | Mole fraction of co-monomer (%) | Melting point Tm (°C.) | Metal exposure of the can end's inside surface (mA) | | corrosion resistance | Pack Test II | | Feathering | |
|---|---|---|---|---|---|---|---|---|---|---|---|---|
| | | | | | | scored part | Non-scored part | | pinholes yes or no | corrosion at deformed part after dropping | opened at room temp. | sterilized in boiling water |
| 9 | 17.2 | 7.4 | PET/I | 3 | 253 | 20 | 0.000 | Pinholes in scored part | Yes | No | No | No |
| 10 | 18.3 | 8.5 | PET/S | 3 | 255 | 52 | 0.000 | Pinholes in scored part | Yes | No | No | No |
| 11 | 21.7 | 9.5 | PET | 0 | 259 | 104 | 0.000 | Pinholes in scored part | Yes | No | Yes | Yes |
| 12 | 25.7 | 35.1 | PET | 0 | 258 | 160 | 0.000 | Pinholes in scored part | Yes | No | Yes | Yes |
| 13 | 30.8 | 55.2 | PET | 0 | 259 | 280 | 0.000 | Pinholes in scored part | Yes | No | Yes | Yes |
| 14 | 3.6 | 9.1 | PET/I | 25 | 193 | 0.000 | 65 | Pinholes in rivet and bead | Yes | Rusting | No | No |
| 15 | 2.5 | 8.8 | PET/S | 30 | 198 | 20 | 120 | Pinholes in score, rivet and bead | Yes | Rusting | No | No |
| 16 | 7.5 | 31.2 | PET/I | 10 | 240 | 5.0 | 5.3 | Pinholes in score, rivet and bead | Yes | No | No | No |
| 17 | 8.5 | 34.1 | PET/S | 10 | 246 | 12 | 21 | Pinholes in score, rivet and bead | Yes | No | No | No |
| 18 | 9.7 | 63.4 | PET/I | 12 | 233 | 33 | 40 | Pinholes in score, rivet and bead | Yes | No | No | No |

(1) Composition PET: polyethylene terephthalate
PET/I: polyethylene terephthalate/isophthalate copolyester
PET/S: polyethylene terephthalate/sebacate copolyester According to the present invention, as is obvious from the foregoing Examples, for the easily openable metal vessel lid which is opened by severing the score with the opening piece, formation of pinholes and cracks in the scored part can be prevented and the corrosion resistance of the whole can end including the scored part can be markedly improved by selecting a biaxially drawn polyester film to be provided onto at least the internal surface of the metallic material which has the X-ray diffraction intensity ratio of $I_A/I_B$ falling within the range of from 4 to 17 and an in-plane anisotropy index of 30 or less. Moreover, the openability was improved with a less power required to open the vessel lid and formation of feathering can be prevented.

We claim:

1. An easily openable vessel lid of a can having excellent corrosion resistance, openability and feathering resistance, which comprises a laminate constructed of a metallic material for the vessel lid and a biaxially drawn polyester film composed mainly of ethylene terephthalate units provided onto at least the internal surface, the aforementioned film having an X-ray diffraction intensity ratio represented by the following formula:

$$17 \geq I_A/I_B \geq 4$$

wherein $I_A$ is the X-ray diffraction intensity on the plane of diffraction parallel to the surface of the polyester film, which has a spacing of about 0.34 nm (CuKα X-ray diffraction angle is 21.5 Deg. to 24 Deg.), and $I_B$ is the X-ray diffraction intensity by the plane of diffraction parallel to the polyester film surface, which has a spacing of about 0.39 nm (CuKα X-ray diffraction angle is 21.5 Deg. to 24 Deg.), and having an in-planed anisotropy index of crystal orientation of 30 or less.

2. The vessel lid as set forth in claim 1 in which the aforementioned biaxially drawn film consists of a copolymerized polyester comprising ethylene terephthalate units mainly and small amounts of other ester units and having a melting point in the range of from 210 Deg. C. to 252 Deg. C.

3. The vessel lid as set forth in claim 1 in which the aforementioned metallic material is an aluminum alloy.

4. The vessel lid as set forth in claim 1 in which the aforementioned metallic material is a surface treated steel sheet and the aforementioned biaxially drawn film had $I_A/I_B$ of $$15 \geq I_A/I_B \geq 4.$$

5. The vessel lid as set forth in claim 1 in which the aforementioned biaxially drawn film is crystal oriented so that its density will fall within the range of from 1.345 to 1.395 g/cm$^3$.

* * * * *